United States Patent
Ohsono et al.

(10) Patent No.: US 7,349,610 B2
(45) Date of Patent: Mar. 25, 2008

(54) OPTICAL FIBER COILED CORD

(75) Inventors: Kazumasa Ohsono, Tokyo (JP); Masao Tachikura, Tokyo (JP); Yoshinori Kurosawa, Tokyo (JP); Yoshikazu Namekawa, Tokyo (JP); Kenji Kawase, Tokyo (JP); Toshio Kurashima, Tokyo (JP); Eiji Araki, Tokyo (JP); Katumi Hiramatu, Tokyo (JP)

(73) Assignees: Hitachi Cable, Ltd., Chiyoda-ku, Tokyo (JP); Nippon Telegraph and Telephone Corporation, Musashi-no-shi, Tokyo (JP)

( * ) Notice: Subject to any disclaimer, the term of this patent is extended or adjusted under 35 U.S.C. 154(b) by 0 days.

(21) Appl. No.: 10/558,890

(22) PCT Filed: Jun. 30, 2004

(86) PCT No.: PCT/JP2004/009592

§ 371 (c)(1),
(2), (4) Date: Dec. 2, 2005

(87) PCT Pub. No.: WO2005/003833

PCT Pub. Date: Jan. 13, 2005

(65) Prior Publication Data

US 2006/0257086 A1  Nov. 16, 2006

(30) Foreign Application Priority Data

Jul. 1, 2003   (JP) ............................. 2003-189729

(51) Int. Cl.
    *G02B 6/02*  (2006.01)
(52) U.S. Cl. .................... 385/123; 385/124; 385/125; 385/126; 385/127

(58) Field of Classification Search ......... 385/123–128
    See application file for complete search history.

(56) References Cited

U.S. PATENT DOCUMENTS

| 4,357,500 A |   | 11/1982 | Nilsen |         |
|-------------|---|---------|--------|---------|
| 6,816,659 B2 | * | 11/2004 | Gorni et al. | 385/125 |

FOREIGN PATENT DOCUMENTS

| GB | 2 337 867 A |   | 12/1999 |
|----|-------------|---|---------|
| JP | 55-22768    | * | 2/1980  |
| JP | 59-63915    |   | 4/1984  |
| JP | 61-26012    |   | 2/1986  |
| JP | 61-35408    |   | 2/1986  |
| JP | 3-24003     |   | 2/1991  |
| JP | 4-18812     |   | 2/1992  |
| JP | 7-25648     |   | 5/1995  |

(Continued)

OTHER PUBLICATIONS

International Search Report, dated Oct. 12, 2004.

(Continued)

*Primary Examiner*—Jennifer Doan
(74) *Attorney, Agent, or Firm*—McGinn IP Law Group, PLLC

(57) ABSTRACT

An optical fiber coiled cord having a coil construction in which an optical fiber cord is spirally bent to obtain lengthwise stretchability, wherein the fiber coiled cord is provided with a stretch length control member which restricts lengthwise elongation.

11 Claims, 6 Drawing Sheets

FOREIGN PATENT DOCUMENTS

| | | | |
|---|---|---|---|
| JP | 7-140399 | | 6/1995 |
| JP | 10003019 | * | 1/1998 |
| JP | 2000-101701 | | 4/2000 |
| JP | 2003-78599 | | 3/2003 |
| JP | 2004-219545 | | 8/2004 |
| WO | WO 99/57363 | | 11/1999 |

OTHER PUBLICATIONS

Horima, H., et al., "Development of Optical Curl Cord Cable Using Glass Fiber", Proceedings of the 34th International Wire and Cable Symposium, Nov. 1985, pp. 16 to 20.

"Development of World's First Expandable Optical Communications Cable", Electronic Technology, Mar. 1985, vol. 19, No. 3, p. 52.

Dazai, Masahiko, et al., "Development of Optical curl Cord", Showa 60 Nendo National Convention Record, the Institute of Electronics and Communication Engineers of Japan (9), Mar. 5, 1985, pp. 9-106.

Kobayashi, Toshiaki, et al., "Optical Curl Cord", Showa 60 Nendo National Convention Record, the Institute of Electronics and Communication Engineers of Japan (9), Mar. 5, 1985, pp. 9-107.

Yao, Bing, et al., "A Study of Utilization of Holey Fibers", The Institute of Electronics, Information and Communication Engineers, vol. 102, No. 581, Jan. 16, 2003, pp. 47-50.

Yao, Bing, et al., "A Study of Utilization of Holey Fibers", 2003 Nen The Institute of Electronics, Information, and Communication Engineers, Electronics 1, Mar. 3, 2003, p. 230.

Zhou, Jian, et al., "A Study on Bending Loss Characteristics of Hole Assisted Optical Fiber", 2003 Nen The Institute of Electronics, Information, and Communication Engineers, Mar. 3, 2003, p. 632.

* cited by examiner (a)

(b)

OPTICAL FIBER COILED CORD

The present application is based on Japanese patent application No. 2003-189729, the entire contents of which are incorporated herein by reference.

TECHNICAL FIELD

The present invention relates to an optical fiber cord for quartz optical fibers and particularly, to an optical fiber coiled cord.

BACKGROUND ART

Metal core coiled cords have wide uses including cords of old-type telephones (whose body is connected to a receiver by means of a wire) because of stretchability and excellent capability for storage when compressed.

Optical fiber coiled cords also already exist.

Previous mainstream optical fibers are shortwave-band multimode fibers (see, 1985 Institute of Electronics, Information and Communication Engineers, National Convention, 2116, "Development on Optical Coiled Cords", Dazai, et al., pp. 9-106; and 1985 Institute of Electronics, Information and Communication Engineers, National Convention, 2117, "Study on Prototype Optical Coiled Cords", Kobayashi, et al., pp. 9-107).

The fabrication method for a coiled cord winds an optical fiber cord around a winding core, followed by high-temperature heat treatment for holding its coiled shape caused by heat deformation. In a quartz optical fiber, its coiled shape is held by causing heat deformation to its optical fiber coatings and cord coverings, while in a plastic fiber, its coiled shape is held by causing deformation to the optical fiber itself as well as its optical fiber coatings and cord coverings.

The problem in replacing a metal cord core with an optical fiber cord core is that there is an increase in optical transmission loss caused when the optical fiber is bent or twisted. Regarding a bend loss, there is recently reported an optical fiber whose tolerance is higher than that of conventional optical fibers.

For instance, a Holey fiber (hereinafter, "HF") has a plurality of air holes around a core to reduce an effective refractive index of the optical fiber to thereby enhance its light confinement effect, which results in a less optical loss, even when bent with a small bend diameter, than that of conventional optical fibers. As an example, there is an HF whose optical loss is 0.001 dB even when bent with a diameter of 10 mm. For that reason, almost no optical loss increase would be seen by use of the HF as an optical fiber for optical fiber coiled cords, even when the HF is formed in a coiled cord shape consisting of a series of spiral small bends. (See, 2003 Institute of Electronics, Information and Communication Engineers, C-3-90, "A study on practical use of Holey fibers", Yao-B, et al.)

The purpose of a coiled cord is to set and vary freely the distance between two points connected by the cord. By use of an optical fiber coiled cord using an HF, even when the HF is bent with a small diameter, no loss increase is caused, and even when the cord is stretched and compressed, no loss variation is caused, allowing the optical fiber coiled cord to be very stable in the loss property for stretching and compression.

To maintain stretchability of the coiled cord, the distance between ends of the cord is variable, but there is concern for stretching the cord to its entire elongated length (making the cord straight with no bends) when varied.

Optical connectors for mechanical connection are typically respectively attached to two ends of an optical fiber. Quartz is often used in making an optical fiber, whose diameter is very small, typically 125 μm. For that reason, when optical connectors are attached and fixed to the optical fiber, the optical fiber-holding force is not large, the optical connectors and optical fiber cord cannot be tensioned with very strong force. For the JIS C 6821 (an optical fiber mechanical property testing method), there is a tension test standard which defines that the force acting on an optical connector due to tension of a coiled cord is less than 5 kg. No problem arises with an elongation of a coiled cord whose tensile force is smaller than 5 kg defined, so that there is sufficient room for the elongation of the coiled cord.

Because an optical fiber coiled cord is, in many cases, used under the conditions for setting freely the distance between optical connectors, which can cause the coiled cord to be tensioned with a stronger force than the standard (less than 5 kg) in such a manner that its entire elongated state is repeated, however, there is concern for breakage of the optical fiber coiled cord, or for breakage of the optical connectors due to an excessive tensile load acting thereon. In this manner, when the distance between the optical connectors is varied, there is fully considered to be the possibility of an excessive force exceeding 5 kg acting between the optical fiber cord and the optical connectors.

That is, it is expected that, in an optical fiber coiled cord, there would be many cases where a tensile load is applied from the optical fiber cord to its optical connectors with more frequency than in typical optical fiber cords, and in the worst case, there is concern for breakage of the optical fiber cord and the optical connectors.

Accordingly, it is an object of the present invention to provide an optical fiber coiled cord in which no damage is caused to optical connectors and the optical fiber cord when the optical fiber cord is tensioned.

DISCLOSURE OF INVENTION

In order to attain the above object, according to one aspect of the present invention, an optical fiber coiled cord comprises:

an optical fiber cord spirally bent for having a coil shape for being longitudinally stretchable; and a stretch length control member for limiting a longitudinal elongation.

The optical fiber coiled cord may further comprise:

optical fiber connectors respectively attached to two ends of the optical fiber coiled cord to connect the stretch length control member to both the connectors so that the distance between both the connectors is not more than a constant distance.

The stretch length control member may comprise an elastic member; and a length-regulating member for being elongated in response to a stretching of the elastic member while regulating an elongation of the elastic member to a specified length.

The stretch length control member may be inserted through inside the spiral of the spiral coiled cord.

The optical fiber cord may comprise a built-in Holey optical fiber having a plurality of air holes around a core.

BEST MODE FOR CARRYING OUT THE INVENTION

Figure 1:
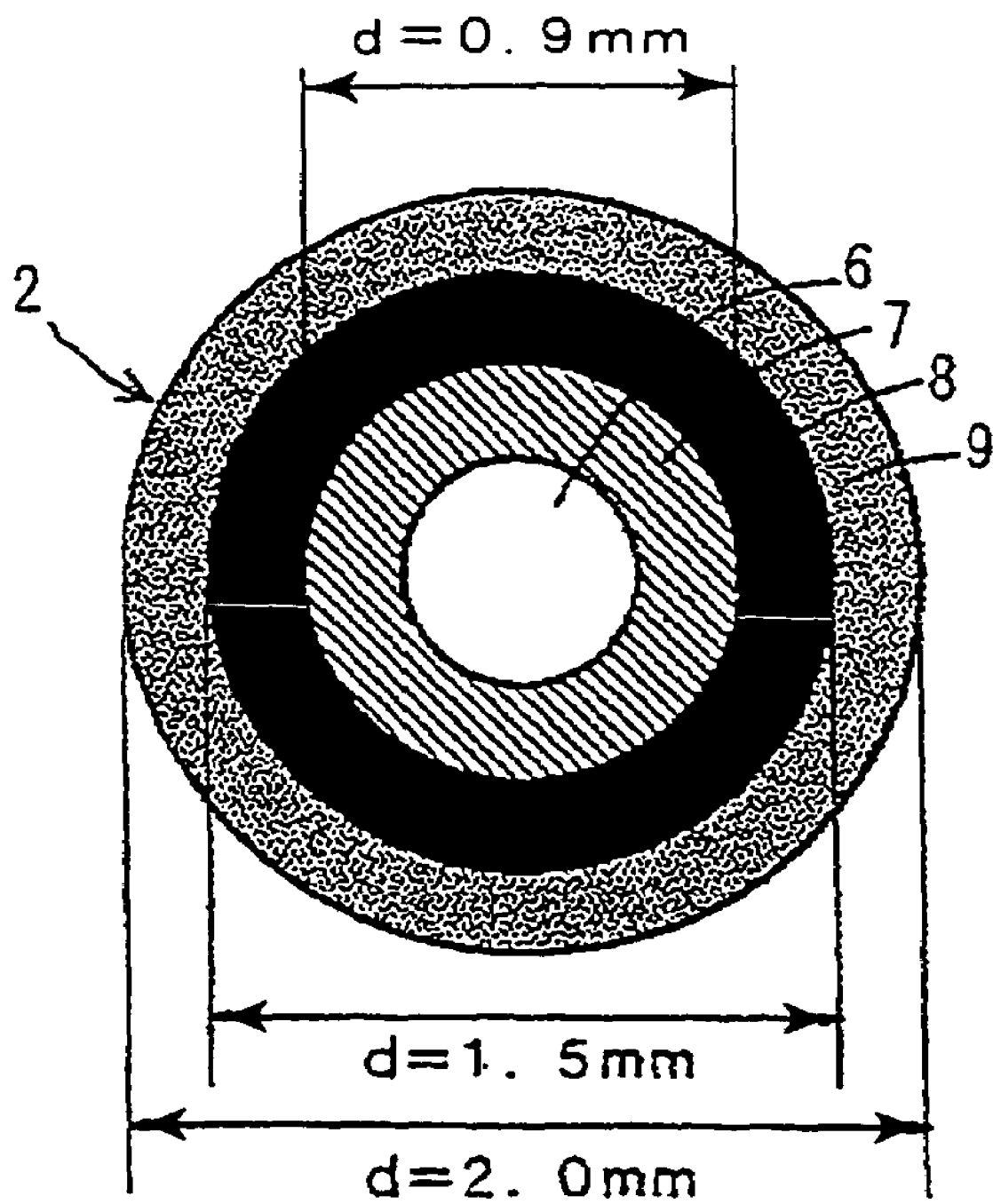
FIG. 1 is a cross-sectional view illustrating an optical fiber cord used as an optical fiber coiled cord according to an embodiment of the invention.

The preferred embodiments according to the invention will be explained below referring to the drawings.

FIG. 1 illustrates a cross-sectional view of an optical fiber cord 2 used in an embodiment of the invention.

The optical fiber cord 2 illustrated has a nylon core of d=0.9 mm formed by applying a nylon coating 7 to an HF 6 with a UV coating of 0.25 mm. Further, the nylon core is surrounded by a Kevlar® fiber 8 of a total of approximately 4000 deniers, and is then covered with a cord sheath 9 of flame retardant-containing Hytrel® (made by Du Pont-Toray Co., Ltd.) of an outside diameter d=2.0 mm/inside diameter d=1.5 mm. This optical fiber cord 2 presupposes use at home, and in which is mixed approximately 25 wt. % of inorganic phosphorus-based flame retardant, and which has passed the flame retardant test (60-degree incline).

The HF 6 used in the optical fiber cord 2 is explained next.

Figure 2:
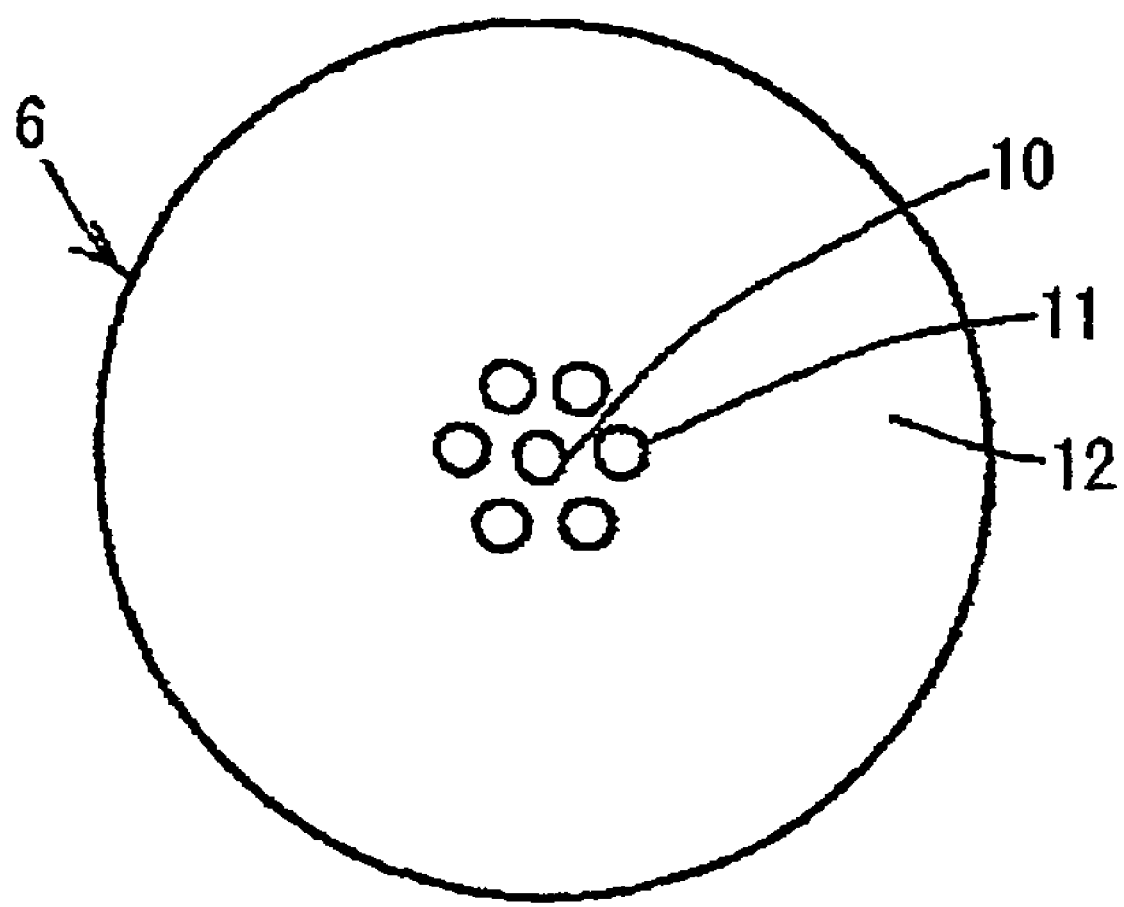
FIG. 2 is a cross-sectional view illustrating a Holey optical fiber used in an optical fiber coiled cord according to an embodiment of the invention.

FIG. 2 is a cross-sectional view illustrating the HF 6 used in the optical fiber cord 2. The HF 6 comprises a core 10 for transmitting light; a cladding 12 with a lower refractive index than that of the core 10; and air holes 11 provided around the core 10. The diameter of the cladding 12 of the HF 6 is d=125 µm, and the central core 10 is doped with germanium, as in a typical single mode fiber (hereinafter, "SMF").

The diameter of the core 10 is approximately 9 µm, and the relative refractive index difference to the surrounding pure quartz cladding 12 is 0.35%. Around the core 10, there are the 6 air holes 11 with a diameter of d=8 µm formed circumferentially at equal intervals over the entire length of the optical fiber.

The features of the HF 6 are that the effective refractive index of peripheral portions of the air holes 11 provided around the core 10 is lower than that of the quartz cladding 12, and therefore the effective relative refractive index between the core 10 and the cladding 12 is greatly larger than that of the typical SMF, which results in high light confinement effects in the core 10, thus enhancing substantially the bending properties.

Figure 3:
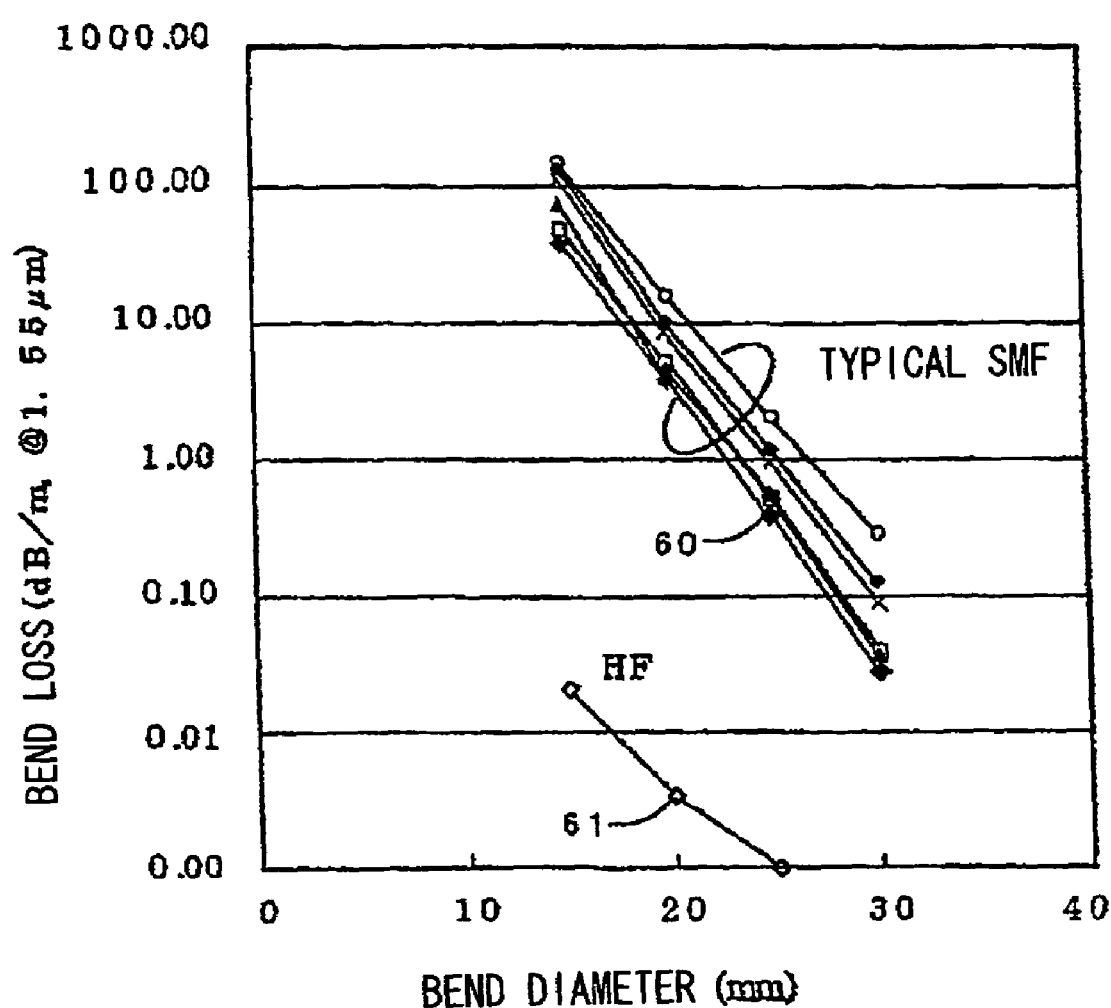
FIG. 3 is a characteristic diagram showing bending properties of a Holey optical fiber and a typical single mode fiber.

FIG. 3 shows a result of comparing the bending properties of the HF 6 used in the optical fiber coiled cord 1 to the bending properties of the SMFs.

The bend loss properties of optical fibers vary according to core relative refractive index differences, core diameters, and refractive index distribution shapes. Shown are the measured values for the bending properties of the several kinds of typical SMFs.

In FIG. 3, the horizontal axis represents the bend diameter (mm), and the vertical axis represents the bend loss (dB/m, @1.55 µm), and in which is shown the loss at a 1.55 µm band, which is caused when the typical SMFs are wound by 1 m around mandrels (not illustrated) of diameters 15, 20, 25, and 30 mm.

In the bending properties of the SMFs in the diagram, even in the SMF with the lowest bend loss (indicated by the broken line with the black rhombic marks 60), a loss of 0.35 dB/m is caused at a diameter of 25 mm.

Accordingly, in a 10-m coiled cord, a loss of approximately 3.5 dB is caused, which exceeds a practical transmission loss of optical fiber cords, which would be 1-2 dB.

In contrast, as shown, the bending properties of the HF 6 (indicated by the broken line with the white rhombic marks 61) are that almost no loss increase is seen at a bend diameter of 25 mm, a loss of 0.003 dB/m at a bend diameter of 20 mm, and a loss of 0.02 dB/m at a bend diameter of 15 mm, which is the substantially less increase in loss than in the typical SMFs. The bend loss of the HF 6 is small compared to that of the typical SMFs, and in the HF 6, there is zero increase in loss of light at bend diameters of more than 25 mm.

Figure 4:
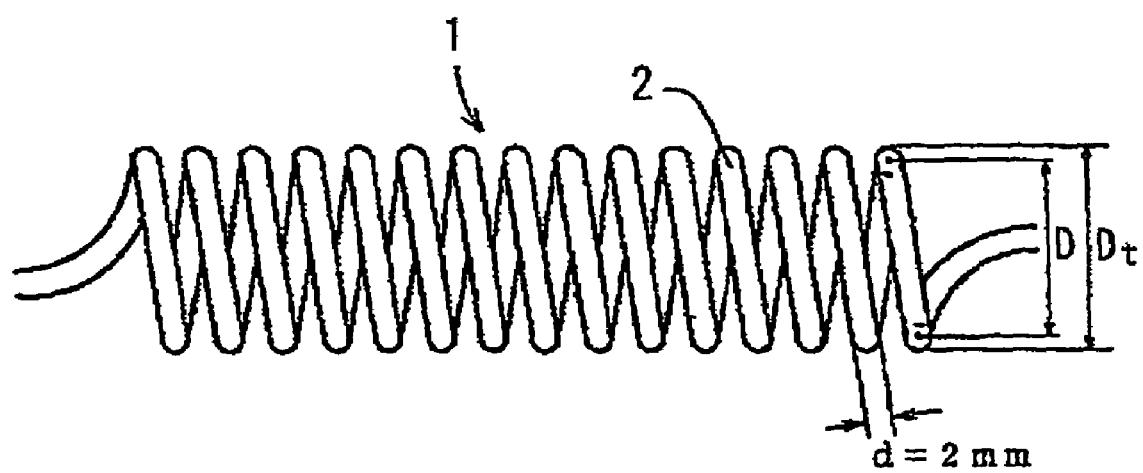
FIG. 4 is a side view illustrating an optical fiber coiled cord according to an embodiment of the invention.

FIG. 4 illustrates an optical fiber coiled cord 1 formed, for example, by spirally winding the above-described optical fiber cord 2 with a length of 10 m around a stainless mandrel (not illustrated) with a diameter of 10 mm and a length of 600 mm, and subsequently fixing both its end portions thereto, followed by heat treatment in an oven at 100° C. for 30 min for a permanent finish of the optical fiber cord 2, and subsequent detachment thereof from the mandrel.

The cord diameter of this optical fiber coiled cord 1 is d=2 mm. The winding diameter of the coiled cord 1 when wound around the mandrel is 12 mm, which expands to 16 mm after detachment from the mandrel. In this embodiment of FIG. 4, D=Dt−d=18 mm−2 mm=16 mm, where:

D is the winding diameter at the center of the optical fiber cord 2 constituting the optical fiber coiled cord 1;

Dt is the outside diameter of the spiral of the optical fiber coiled cord 1; and d is the diameter of the optical fiber cord 2.

For the optical fiber coiled cord 1 as in the state illustrated, cutback measurements show that the transmission loss at a 1.55 µm wavelength is less than 0.01 dB including measurement errors.

Figure 5:
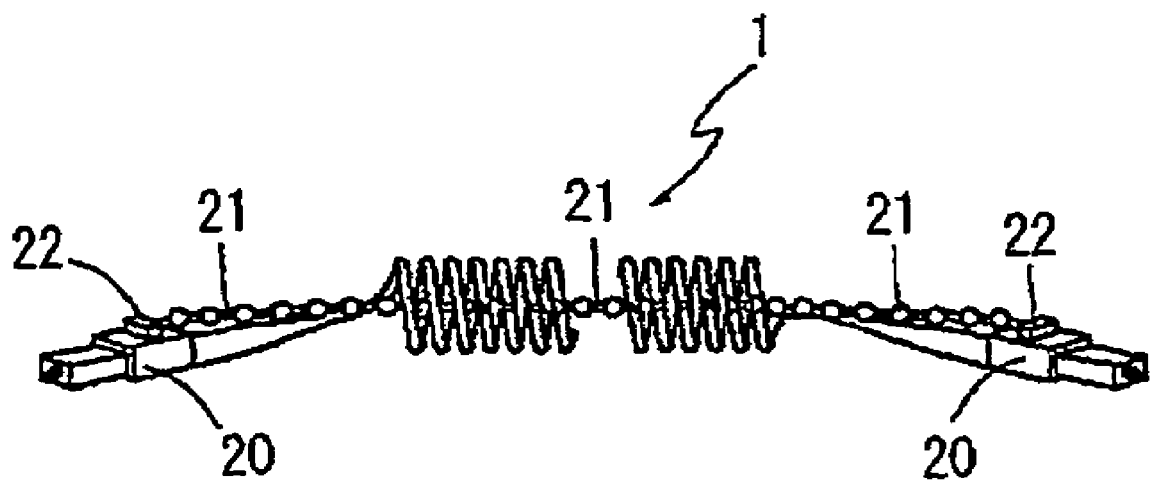
FIG. 5 is an optical fiber coiled cord equipped with a stretch length control member according to an embodiment of the invention.

Next, as illustrated in FIG. 5, optical connectors 20 are respectively attached to two ends of the above optical fiber coiled cord 1. The shape of the optical connectors 20 may be selected according to use purposes. In this embodiment, SC-type connectors which are widely used are mounted to the optical fiber coiled cord 1.

For each chassis of the optical connectors 20, there is provided a jig 22 for fixing a stretch length control member 21 comprising a string, etc., for controlling an elongation of the optical fiber coiled cord 1. The stretch length control member 21 is inserted through inside the spiral of the optical fiber coiled cord 1. It is desirable that the stretch length control member 21 itself is flexible and stretchable, and has high tensile rigidity.

The reason for positioning, inside the coil forming the coil spiral, the stretch length control member 21 for regulating an elongation of the optical fiber coiled cord 1, is because the stretch length control member 21 (in a string/chain form, for example) is, in many cases, longer than the compressed length of the optical fiber coiled cord 1, and therefore the stretch length control member 21, if present outside the coil spiral, would be subject to constraints from obstacles other than the optical fiber coiled cord 1, which would result in the possibility of no assumed sufficient stretch control length of the optical fiber coiled cord 1. Further, it is also desirable from the point of view of good appearance that the stretch length control member 21 is present inside the coil spiral.

Although stretching/compressing the optical fiber coiled cord 1 produces torsion in the entire optical fiber cord 2, no loss variation due to the torsion is observed at all. It is also confirmed that stress caused by the torsion has almost no effect on the reliability of the optical fiber cord 2.

Figure 6:
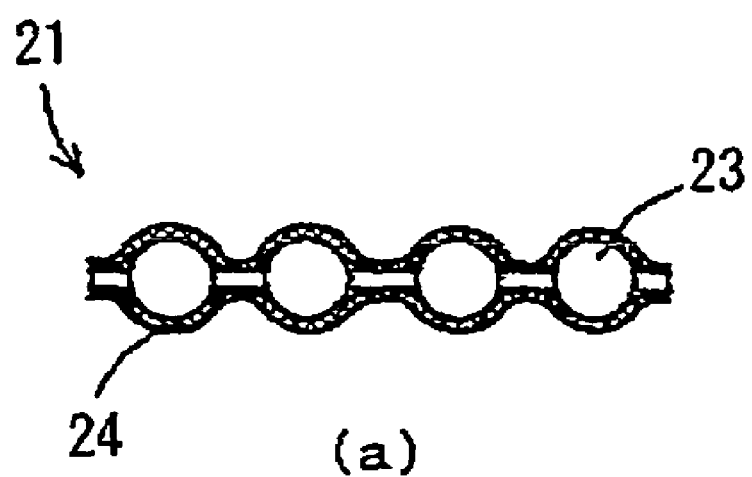
FIG. 6(a) is a cross-sectional view illustrating an elongated state of the stretch length control member used in the optical fiber coiled cord.
FIG. 6(b) is a cross-sectional view illustrating a contracted state of the stretch length control member used in the optical fiber coiled cord.
Figure 6:
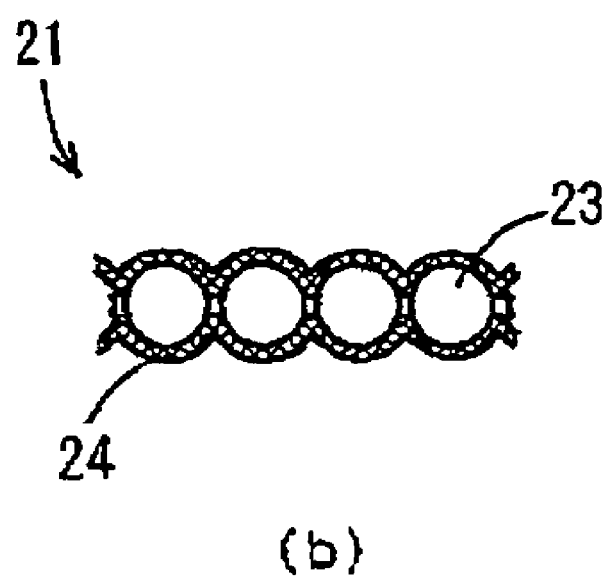

FIGS. 6(a) and 6(b) illustrate one example of the stretch length control member 21 for controlling an elongation of the optical fiber coiled cord 1. FIG. 6(a) illustrates an elongated state of the stretch length control member 21, and FIG. 6(b) a contracted state (steady state) of the stretch length control member 21.

As illustrated, the stretch length control member 21 comprises a metallic ball chain 23 for serving as a length-regulating member, and a rubber sheath 24 covering the ball chain 23 for serving as an elastic member. The ball chain 23 comprises a pipe (or a bar) unremovably inserted through hollow balls in such a manner that, in a contracted state of the ball chain 23, the pipe hides in the balls, while in an elongated state of the ball chain 23, the pipe appears from the balls. The rubber sheath 24 is caused to cover the balls in the most contracted state of the ball chain 23.

This stretch length control member 21 is elongated in response to tensile force. With increasing tension, the stretch length control member 21 is elongated until its elongation is limited by a reaction force at a maximum elongation of the ball chain 23. The stretch length control member 21 is not elongated greater than the maximum elongation. The maximum elongation length of the stretch length control member 21 is set to be shorter than an allowable elongation length of the optical fiber coiled cord 1.

The optical fiber coiled cord 1 tensioned together with the stretch length control member 21 is not elongated greater than the maximum elongation length of the stretch length control member 21, so that no excessive elongation in conventional optical fiber coiled cords is caused. When the elongation of the stretch length control member 21 does not reach its maximum elongation length, the optical fiber coiled cord 1 is elongated in a state where contraction and tension forces by the rubber sheath 24 provided around the ball chain 23 balance each other out, combining with a contraction force of the optical fiber coiled cord 1 itself, so that the optical fiber coiled cord 1 is in an elongated state for sufficiently allowing no excessive load to be applied to the optical fiber cord 2.

The stretch length control member 21 limits an elongation of the optical fiber coiled cord 1. An optical fiber coiled cord with no stretch length control member 21 when used is elongated by its tensioned length, whereas the optical fiber coiled cord 1 with the stretch length control member 21 is not elongated greater than the maximum elongation length of the stretch length control member 21. In this manner, the elongation length of the optical fiber coiled cord 1 is limited effectively by the stretch length control member 21.

Also, in a state where the stretch length control member 21 is elongated to its maximum elongation length, a tensile force acting on the optical fiber coiled cord 1 is absorbed by the stretch length control member 21 and the optical connectors 20, no excessive force is applied to the optical fiber cord 2 constituting the optical fiber coiled cord 1. This has the excellent effect of being capable of protecting the optical fiber coiled cord 1 and the optical connectors 20 from breakage due to excessive stretching.

INDUSTRIAL APPLICABILITY

In accordance with the present invention, an optical fiber coiled cord can be provided that no damage is caused to optical connectors and the optical fiber cord when the optical fiber cord is tensioned.

The invention claimed is:

1. A transmission line, comprising:
    an optical fiber cord having a coil shape for allowing an elongation of said optical fiber cord;
    a stretch length control member for controlling a length of said elongation of said optical fiber cord;
    an optical fiber connector formed on an end of said optical fiber cord and connected to said stretch length control member; and
    another optical fiber connector formed on another end of said optical fiber cord and connected to said stretch length control member,
    wherein in a state where said stretch length control member is elongated to a maximum elongation length, a tensile force acting on said optical fiber cord is absorbed by said stretch length control member and said optical fiber connectors.

2. The transmission line according to claim 1, wherein said stretch length control member is formed in a coil of said optical fiber cord.

3. The transmission line according to claim 1, wherein a length of said stretch length control member is greater than a length of said optical fiber cord in a steady state, and
    wherein a length of said optical fiber cord in an elongated state is not greater than a maximum elongated length of said stretch length control member.

4. The optical transmission line according to claim 1, wherein the stretch length control member is inserted through the spiral of the spiral coiled cord.

5. The optical transmission line according to claim 1, wherein the stretch length control member is inserted through the spiral of the spiral coiled cord.

6. The optical transmission line according to claim 1, wherein the optical fiber cord comprises a built-in Holey optical fiber having a plurality of air holes around a core.

7. The optical transmission line according to claim 1, wherein the optical fiber cord comprises a built-in Holey optical fiber having a plurality of air holes around a core.

8. The optical transmission line according to claim 1, wherein said stretch length control member comprises a ball chain.

9. The optical transmission line according to claim 8, wherein the ball chain comprises metallic balls.

10. The optical transmission line according to claim 1, wherein the stretch length control member comprises an elastic member and a length-regulating member for being elongated in response to a stretching of the elastic member while regulating an elongation of the elastic member to a specified length, and
    wherein the length-regulating member comprises a ball chain.

11. The optical transmission line according to claim 10, wherein the elastic member comprises rubber.

* * * * *